(12) United States Patent
Stefani

(10) Patent No.: US 10,654,239 B2
(45) Date of Patent: May 19, 2020

(54) EMBOSSED MULTILAYERED CELLULOSE PRODUCT AND MEANS FOR THE PRODUCTION THEREOF

(71) Applicant: SOFIDEL S.P.A., Porcari (LU) (IT)

(72) Inventor: Emi Stefani, Porcari (IT)

(73) Assignee: SOFIDEL S.P.A., Porcari, (LU) (IT)

( * ) Notice: Subject to any disclaimer, the term of this patent is extended or adjusted under 35 U.S.C. 154(b) by 103 days.

(21) Appl. No.: 15/506,919

(22) PCT Filed: Aug. 6, 2015

(86) PCT No.: PCT/IB2015/055968
§ 371 (c)(1),
(2) Date: Feb. 27, 2017

(87) PCT Pub. No.: WO2016/030784
PCT Pub. Date: Mar. 3, 2016

(65) Prior Publication Data
US 2017/0246827 A1    Aug. 31, 2017

(30) Foreign Application Priority Data

Aug. 29, 2014 (IT) ................. FI2014A0193

(51) Int. Cl.
*B32B 3/30* (2006.01)
*B31F 1/07* (2006.01)
(Continued)

(52) U.S. Cl.
CPC ................. *B31F 1/07* (2013.01); *B32B 3/30* (2013.01); *B32B 7/12* (2013.01); *B32B 23/04* (2013.01);
(Continued)

(58) Field of Classification Search
CPC .... B32B 1/06; B32B 3/10; B32B 3/12; B32B 3/28; B32B 3/30; B32B 7/04;
(Continued)

(56) References Cited

U.S. PATENT DOCUMENTS 3,414,459 A    12/1968 Wells
3,961,119 A    6/1976 Thomas
(Continued)

FOREIGN PATENT DOCUMENTS

EP    1 908 579 A1    4/2008
EP    2 018 959 A2    1/2009
(Continued)

*Primary Examiner* — Megha M Gaitonde
(74) *Attorney, Agent, or Firm* — McGlew and Tuttle, P.C.

(57) ABSTRACT

The cellulose product comprises at least a first ply of embossed cellulose material and a second ply of embossed cellulose material, glued together. The first ply comprises: a first series of embossing protuberances with a first height (H'1) and a top surface to which a glue is applied which bonds the first ply and the second ply to one another; a second series of micro-embossing protuberances with a second height (H'2) lower than the first height (H'1); a third series of micro-embossing protuberances with a third height (H'3) lower than the second height (H'2). The protuberances of the first series are distributed over areas of the first ply, where the micro-embossing protuberances of the second series and the micro-embossing protuberances of the third series are absent.

20 Claims, 4 Drawing Sheets

(51) Int. Cl.
*B32B 7/12* (2006.01)
*B32B 23/04* (2006.01)

(52) U.S. Cl.
CPC ............... *B31F 2201/0733* (2013.01); *B31F 2201/0738* (2013.01); *B31F 2201/0761* (2013.01); *B31F 2201/0782* (2013.01); *B31F 2201/0787* (2013.01); *B32B 2317/12* (2013.01)

(58) Field of Classification Search
CPC .. B32B 7/045; B32B 7/08; B32B 7/12; B32B 7/14; B32B 38/0012; B32B 38/06; B32B 2250/03; Y10T 428/24628; Y10T 428/24661; Y10T 428/24802; Y10T 428/24826
USPC ....... 428/174, 175, 176, 178, 179, 181, 183, 428/184, 187, 195.1, 198, 211.1
See application file for complete search history.

(56) References Cited

U.S. PATENT DOCUMENTS

| | | |
|---|---|---|
| 4,320,162 A | 3/1982 | Schulz |
| 5,173,351 A | 12/1992 | Ruppel et al. |
| 6,032,712 A | 3/2000 | Biagiotti |
| 6,109,326 A | 8/2000 | Leakey et al. |
| 6,136,413 A | 10/2000 | Le Port et al. |
| 6,245,414 B1 | 6/2001 | Biagiotti |
| 6,261,666 B1 | 7/2001 | Enderby et al. |
| 6,470,945 B1 | 10/2002 | Biagiotti |
| 6,681,826 B1 | 1/2004 | Biagiotti |
| 2003/0102096 A1 | 6/2003 | Dwiggins et al. |
| 2005/0170145 A1 | 8/2005 | Biagiotti et al. |
| 2006/0286885 A1 | 12/2006 | Schuh et al. |
| 2007/0184246 A1* | 8/2007 | Nencioni ............... D21H 27/02 428/156 |
| 2011/0123773 A1 | 5/2011 | Lofink et al. |

FOREIGN PATENT DOCUMENTS

| | | |
|---|---|---|
| EP | 2 080 611 A1 | 7/2009 |
| WO | 96/18771 A1 | 6/1996 |
| WO | 99/44814 A1 | 9/1999 |
| WO | 00/78533 A1 | 12/2000 |

* cited by examiner

EMBOSSED MULTILAYERED CELLULOSE PRODUCT AND MEANS FOR THE PRODUCTION THEREOF

TECHNICAL FIELD

The present invention relates to improvements to cellulose products, in particular paper, in particular tissue paper.

BACKGROUND ART

For the production of absorbent articles, such as toilet paper, paper towels, paper handkerchiefs or the like, a cellulose material, i.e. made of cellulose fibers, is used as a base material in the form of one or more plies bonded together and variously decorated or worked to achieve particular aesthetic and technical-functional features. The cellulose material used for this type of production is a paper with special softness and absorption capacity features and is usually called "tissue" paper.

One of the most frequently used processes for converting tissue paper for obtaining products of the type mentioned above is embossing. This operation consists in passing the cellulose material in a nip between two rollers provided with protuberances and/or cavities and optionally one of the two provided with an elastically yielding surface, for imparting a permanent mechanical deformation to the base cellulose material. This permanent mechanical deformation, which involves a dislocation, a deformation or a breakage of the fibers of the base material, allows increasing the apparent thickness of the cellulose material and imparting particular technical-functional features to the latter, such as for example a greater apparent thickness, greater absorption capacity, better tactile features, a surface treatment adapted to increase the ability of the material to remove solid or liquid materials from a surface, and other features known to those skilled in the art.

Embossing is also used to impart a particular aesthetic feature to the product, i.e. to make decorations thereon formed by cavities in the outer surface of the cellulose material, corresponding to protuberances of the cellulose material facing towards the interior of the material itself, when this is formed by at least two or more plies bonded together.

Embossing is carried out in embossing units or embossing-laminating units. These latter also have the function of mutually bonding two or more plies, of which at least one is embossed or in which both are embossed separately from each other. Bonding takes place by applying a glue on at least some of the protuberances generated by embossing on at least one of the plies forming the multilayer material using a glue applicator usually arranged along the circumferential development of an embossing roller, upstream of a lamination nip or a gluing nip at which two or more plies are glued together. Lamination of the plies, with mutual compression of one ply against the other to facilitate and promote adhesion, can take place in the gluing nip, usually defined between two embossing rollers, or downstream thereof by using a laminating roller which cooperates with one of the embossing rollers.

For example, U.S. Pat. No. 3,961,119 describes a material having two plies, which are embossed separately with helical patterns at different inclinations and bonded at the intersection of the helical patterns.

U.S. Pat. No. 6,470,945 describes a machine for embossing plies which, once bonded together, form a web material with plies coupled tip-to-tip or nested, respectively. Tip-to-tip bonding means a bonding in which the protuberances of one ply are located at least partly at protuberances of the other ply. Nested bonding, conversely, means a bonding in which the protuberances of one ply nest between the protuberances of the other.

Other embossed multi-ply products and respective devices for the production thereof are described and illustrated for example in U.S. Pat. Nos. 6,261,666, 6,109,326, US-A-2003/0102096, U.S. Pat. No. 6,136,413, WO-A-00/78533, U.S. Pat. Nos. 6,681,826, 3,414,459, 5,173,351, 6,032,712, 6,245,414.

U.S. Pat. No. 4,320,162 discloses a multilayer two-ply product embossed with equal embossing on the two sides, i.e. on the two plies. The embossing is arranged tip-to-tip and consists of large protuberances with a large front surface, between which protuberances with smaller height and smaller size are positioned.

WO96/18771 discloses a multi-ply cellulose product in which the embossed ply has a background micro-embossing and a decorative embossing formed by protuberances with a linear development, i.e. with a longitudinal dimension substantially larger than the transverse dimension. The protuberances forming the decorative embossing are arranged in areas devoid of micro-embossing. The production of this material is obtained by an embossing roller which has a first series of micro-protuberances having a first height, and macro-protuberances of larger size and greater height, provided in areas devoid of micro-protuberances. The micro-protuberances form the background embossing of the cellulose material, while the macro-protuberances form the decorative embossing.

WO99/44814 discloses a method and a device for embossing a multi-ply cellulose material, in which a ply of cellulose material is sequentially embossed twice, using two separate embossing rollers, to obtain a combination of background and decorative protuberances.

According to another production technique, called TAD (Through Air Dryer), a cellulose material having a large volume and a high thickness, accompanied by a high softness, is obtained by drying the cellulose ply with hot air flows, which increase the volume thereof, on forming nets or fabrics, the structure of which is copied on the outer surface of the ply, forming a sort of embossing. TAD plants are extremely expensive and require large amounts of energy.

There is a constant research to identify techniques for embossing, laminating and bonding plies which allow optimizing the yield of these materials from many, even conflicting points of view.

SUMMARY OF THE INVENTION

According to the invention, a cellulose product is provided, comprising at least a first ply of embossed cellulose material and a second ply of embossed cellulose material, glued together, wherein the first ply comprises:
  a first series of embossing protuberances with a first height and a top surface to which a glue is applied, which bonds the first ply and the second ply to one another;
  a second series of micro-embossing protuberances with a second height lower than the first height,
  a third series of micro-embossing protuberances with a third height lower than the second height;
wherein the protuberances of the first series are distributed over areas of the first ply, where the micro-embossing protuberances of the second series and the micro-embossing protuberances of the third series are absent.

Further possible features and embodiments are described hereinafter with reference to embodiments of the invention, and in the appended claims, which form an integral part of the present description.

BRIEF DESCRIPTION OF THE DRAWINGS

The invention will be better understood by following the description and the accompanying drawing, which shows non-limiting practical embodiments of the invention. More particularly, in the drawing:

FIGS. 1A, 1B show enlargements of details in FIG. 1;

DETAILED DESCRIPTION OF METHODS OF EMBODIMENT OF THE INVENTION

Figure 1:
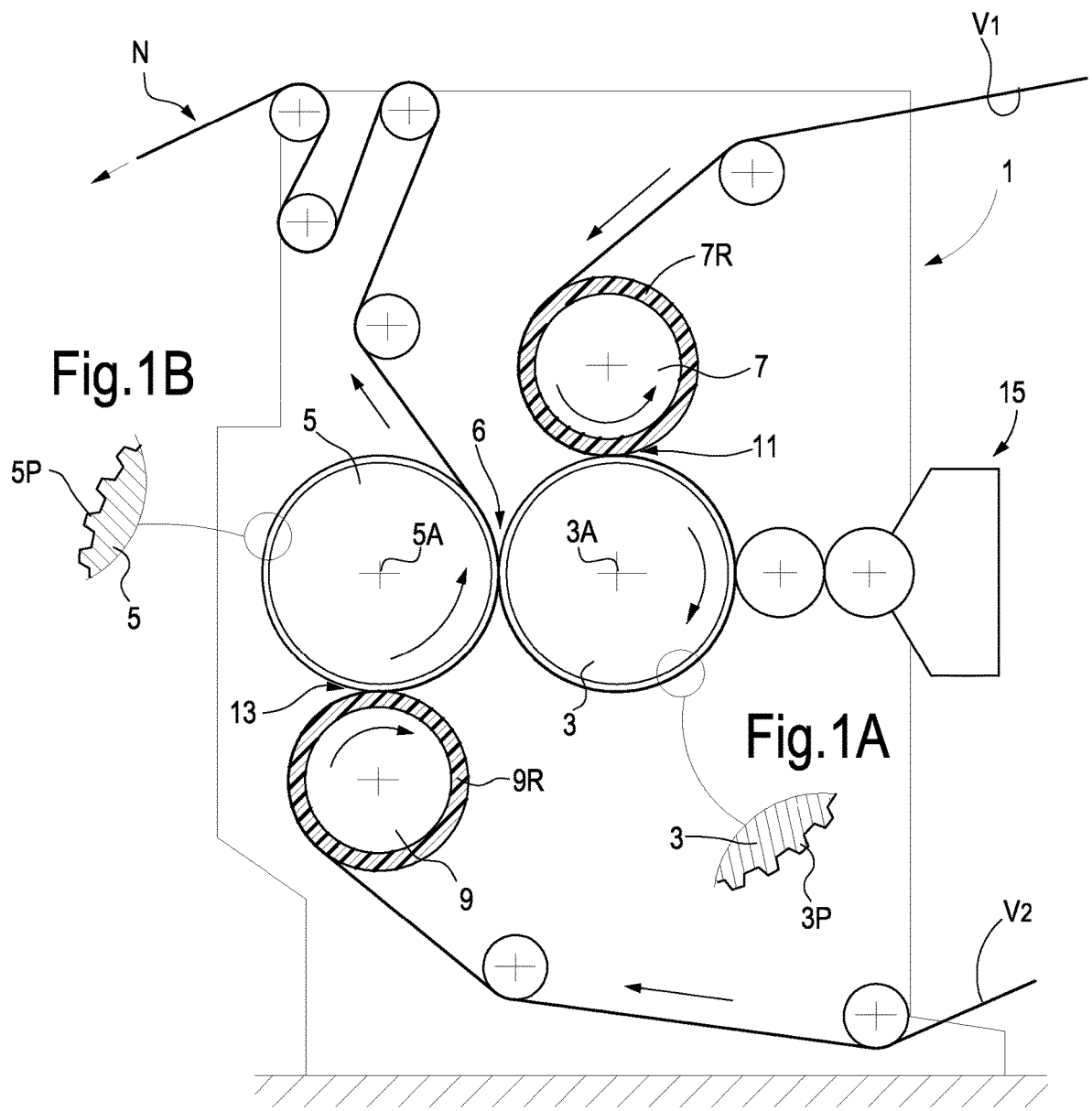
FIGS. 1 and 2 show diagrams of embossing-laminating devices in which the invention may be embodied.

The following detailed description of exemplary embodiments refers to the accompanying drawings. Same reference numerals in different drawings identify the same or similar elements. Also, the drawings are not necessarily to scale. The following detailed description does not limit the invention. Rather, the scope of the invention is defined by the appended claims.

The reference throughout the specification to "one embodiment" or "the embodiment" or "some embodiments" means that a particular feature, structure or element described in relation to an embodiment is included in at least one embodiment of the object described. Therefore, the phrase "in one embodiment" or "in the embodiment" or "in some embodiments" in various points along the description does not necessarily refer to the same embodiment or to the same embodiments. Furthermore, the particular features, structures or elements can be combined in any suitable manner in one or more embodiments.

FIG. 1 shows a schematic side view of an embossing-laminating device 1 of the tip-to-tip type. The embossing-laminating device 1 comprises a first embossing roller 3, rotating around a rotation axis 3A, and a second embossing roller 5, rotating around a rotation axis 5A substantially parallel to the rotation axis 3A of the first embossing roller 3. A lamination nip 6 is defined between the first embossing roller 3 and the second embossing roller 5.

The first embossing roller 3 cooperates with a first pressure roller 7 rotating about an axis which may be approximately parallel to the rotation axis of the embossing roller 3. The second embossing roller 5 cooperates with a second pressure roller 9, whose rotation axis may be approximately parallel to the rotation axis of the second embossing roller 5. A first embossing nip 11 is defined between the first embossing roller 3 and the first pressure roller 7. A second embossing nip 13 is defined between the second embossing roller 5 and the second pressure roller 9.

The first pressure roller 7 may be coated with a coating layer 7R of yielding material, preferably of an elastically yielding material, such as rubber. Likewise, the second embossing roller 9 may be coated with a coating layer 9R of yielding material, preferably an elastically yielding material.

The first embossing roller 3 and the second embossing roller 5 may be provided with a plurality of embossing protuberances, generically indicated with 3P and 5P, respectively, and visible in the schematic enlargements in FIGS. 1A and 1B. Exemplary embodiments of the embossing protuberances 3P and 5P will be described in greater detail hereinafter.

In some embodiments, the first embossing roller 3 cooperates with a glue dispenser 15.

Two paths are defined in the embossing-laminating device 1 for a first ply V1 and a second ply V2 of web material, such as plies of cellulose fibers, in particular plies of tissue paper. The first path for the first ply of web material V1 extends around the first pressure roller 7, extends through the embossing nip 11 and extends around the first embossing roller 3 by passing between the latter and the glue dispenser 15. The second path for the second ply of web material V2 extends around the second pressure roller 9, through the embossing nip 13 and develops around the second embossing roller 5. In the embossing nips 11 and 13, the two plies V1 and V2 are embossed by the effect of the pressure between the respective embossing roller and the respective pressure roller, the embossing protuberances 3P and 5P penetrating into the yielding coating 7R and 9R of the respective pressure roller, generating embossed protuberances in plies V1 and V2.

In the lamination nip 6 between the two embossing rollers 3 and 5, the two paths of plies V1 and V2 join so that plies V1 and V2 are bonded by means of the glue that is applied by the glue dispenser 15 on the embossed protuberances on the first ply V1. In the lamination nip 6, at least some of the embossing protuberances 3P oppose respective embossing protuberances 5P. The pressure exerted between protuberances 3P and 5P causes gluing of the two plies V1 and V2, which in combination form a multi-ply web material N.

Figure 2:
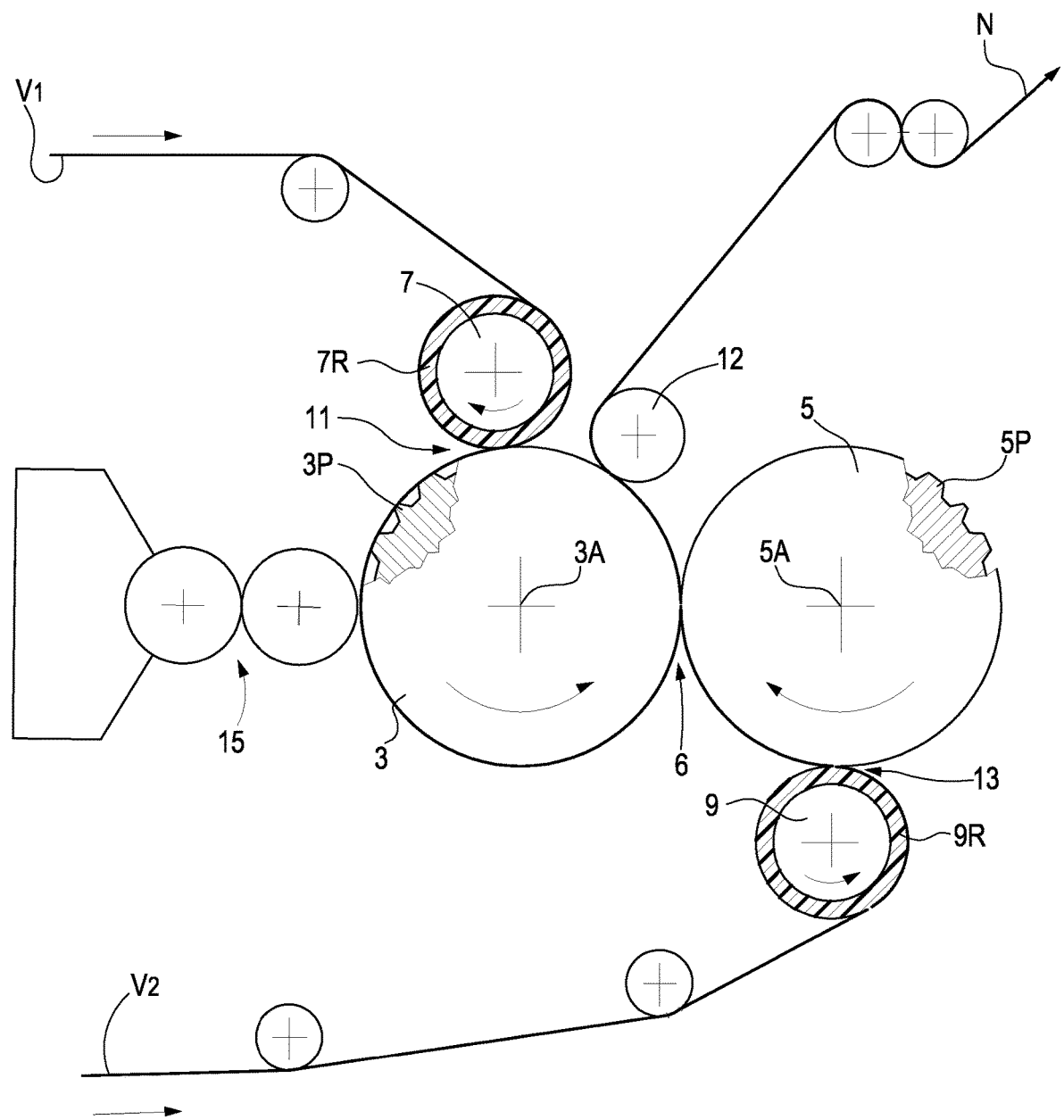

FIG. 2 shows a schematic side view of an embossing-laminating unit of the nested type. Same numbers indicate parts identical or equivalent to those of the embodiment in FIG. 1. These parts are not described again. In this embodiment, the two plies V1 and V2 are not mutually laminated in nip 6 but in a nip 10 formed between the embossing roller 3 and a laminating roller 12, which may be of steel or other rigid material, or coated with an elastically yielding material, preferably of greater hardness than the coating of the pressure rollers 7 and 9.

Figure 3:
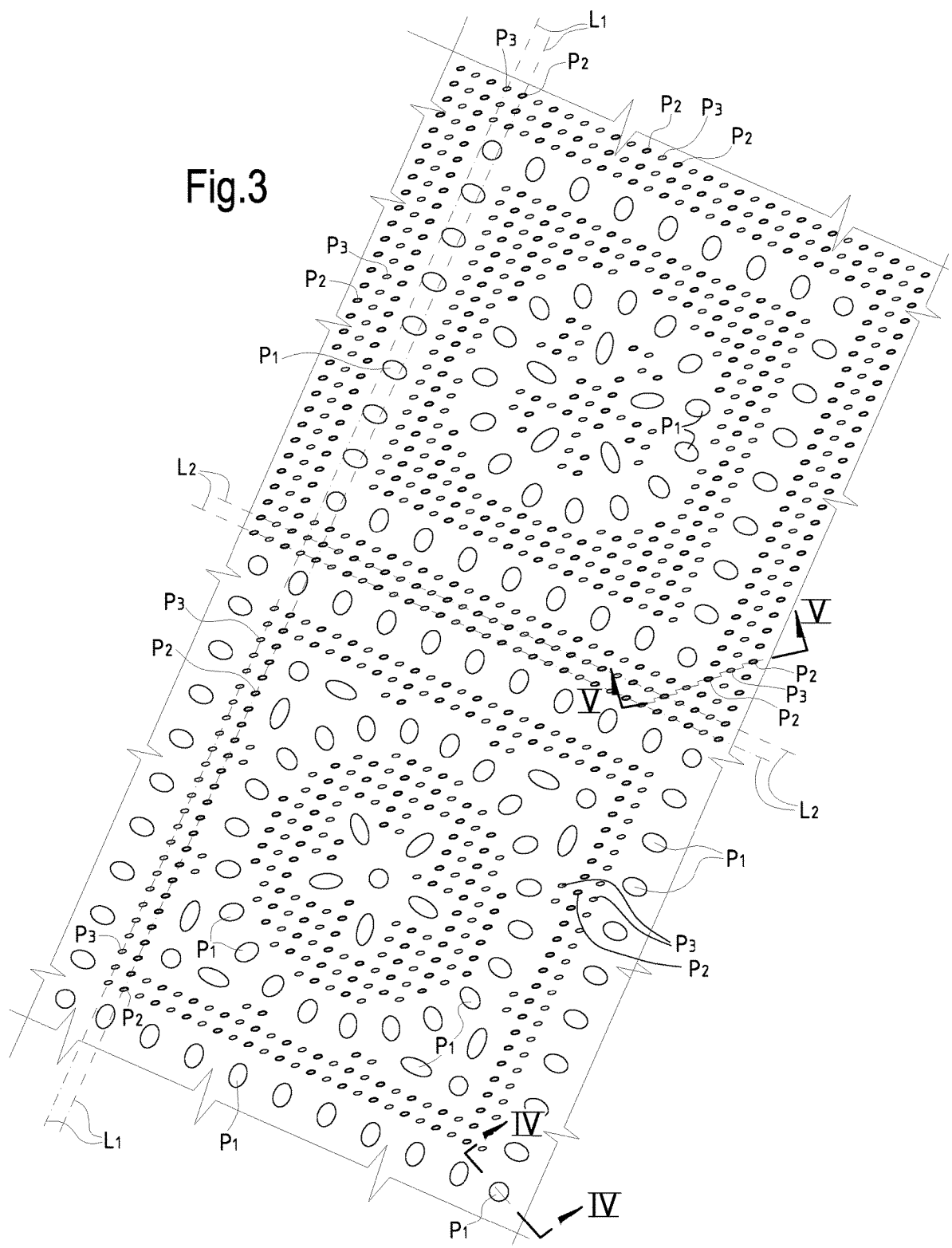
FIG. 3 shows a plan development of a portion of the embossing surface of an embossing roller.

FIG. 3 shows a development of a portion of a ply V1 or V2 embossed with the embossing-laminating device 1 in FIG. 1 or FIG. 2. Since the embossed pattern obtained on the cellulose ply V1 or V2 corresponds to the embossing pattern, that is, to the arrangement of the embossing protuberances of the embossing roller 3 or 7, the representation in FIG. 3 can also be seen as the plan development of a portion of the cylindrical side surface of the embossing roller 3 or the embossing roller 7 of one of the embossing-laminating devices 1 in FIG. 1 or 2.

FIG. 3 shows an embossing pattern including a first series of embossing protuberances P1, a second series of embossing protuberances P2 and a third series of embossing protuberances P3. In this embodiment, the embossing protuberances P1 of the first series are larger in size than the embossing protuberances P2 and P3 and therefore can be easily distinguished from the latter. Only for easier differentiation between protuberances P2 of the second series and protuberances P3 of the third series, in FIG. 3 protuberances P2 are indicated with contour lines of different thicknesses.

Figure 4:
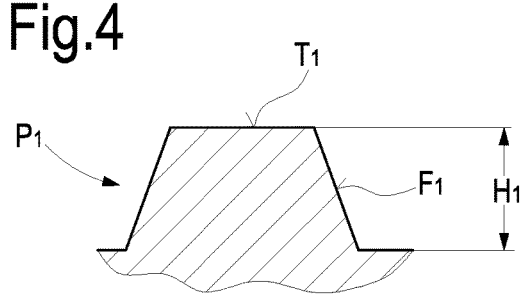
FIGS. 4 and 5 show sections according to IV-IV and VV in FIG. 3.
Figure 5:
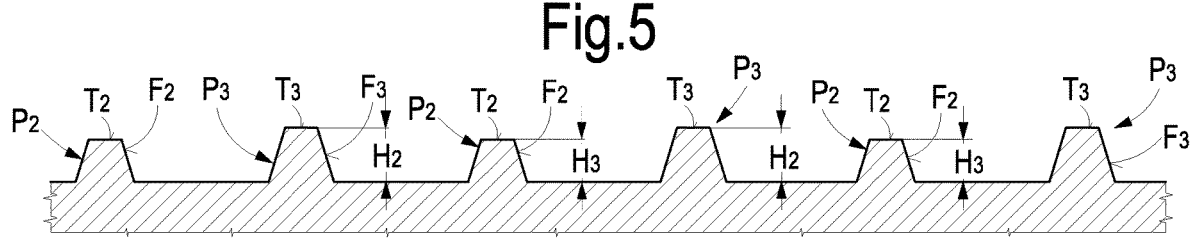

FIGS. 4 and 5 show local enlarged sectional views of the embossing protuberances of a corresponding embossing roller, according to lines IV-VI and V-V, respectively, in FIG. 3. Hereinafter, "embossing protuberances" indicates both the protuberances formed on the embossing roller and the protuberances generated on a ply by the embossing roller. The patterns of the embossing protuberances on the roller and on the ply correspond to each other.

As it can be seen in particular in the sections in FIGS. 4 and 5, the embossing protuberances P1 of the first series have a height $H_1$, while the embossing protuberances P2 and P3 of the second and third series have heights $H_2$ and $H_3$, respectively. In embodiments described herein, heights $H_1$, $H_2$ and $H_3$ are different from one another and are in the following relationship:

$$H_1 > H_2 > H_3$$

that is, protuberances P1 are the highest, while protuberances P3 are the lowest.

Each protuberance P1, P2, P3 has a base and a head surface T1, T2, T3, as well as respective sides F1, F2, F3. In the embodiment shown, the embossing protuberances P1 form a decorative pattern. Each protuberance has a substantially elliptical cross section. It is, however, a mere exemplifying representation, because the shape of protuberances P1 may be different, for example protuberances P1 may have an elongated shape, with a much greater longitudinal dimension, for example ten times or more than ten times greater than the transverse dimension.

In the embodiment shown, the embossing protuberances P2 and P3 of the second series form a background embossing, or a micro-embossing. In the example shown, protuberances P2 and P3 preferably have a cross section with the same shape, for example elliptical. In other embodiments, the cross section of protuberances P2, P3 may be different, for example circular or polygonal, either regular or irregular. In some embodiments, the shape of protuberances P2 may be different than the shape of protuberances P3. For example, protuberances P2 may have a circular cross section and protuberances P3 may have an elliptical cross section.

In the embodiment shown in FIG. 3, the embossing protuberances P2 of the second series and the embossing protuberances P3 of the second series are arranged according to respective alignments, indicated by lines L1 and L2. Lines L1 and L2 in the embossed product can be straight lines, which on the embossing roller correspond to helical lines developing about the rotation axis of the embossing roller.

In some embodiments, lines L1 and L2 may be mutually inclined for example by 90°, as shown in the figure.

In some particularly advantageous embodiments, the embossing protuberances P2 and P3 are arranged in mutually alternate alignments L1. As can be clearly understood from FIG. 3, for example, on a line L1 all embossing protuberances P3 belong to the third series and have a height $H_3$. The embossing protuberances on the adjacent lines L1 are embossing protuberances P2 of the second series and have a height $H_2$. A similar alternating distribution may be provided along lines L2.

In advantageous embodiments, the embossing protuberances P2 of the second series and the embossing protuberances P3 of the third series may be distributed along lines L1 and L2 at a substantially even pitch.

Advantageously, in some embodiments, the embossing protuberances P2 of the second series and the embossing protuberances P3 of the third series may be distributed along lines L1 and L2 according to a pattern with areas devoid of such embossing protuberances P2 and P3. In some embodiments, the embossing pattern may have areas devoid of embossing protuberances P2 of the second series and embossing protuberances P3 of the third series around protuberances P1 of the first series. In the exemplary embodiment in FIG. 3, for example, there are areas indicated with A devoid of embossing protuberances P2, P3 and in which the embossing protuberances P1 of the first series are distributed.

In this way, the effect of giving greater prominence to the pattern formed by the embossing protuberances P1 of the first series is obtained.

Figure 6:
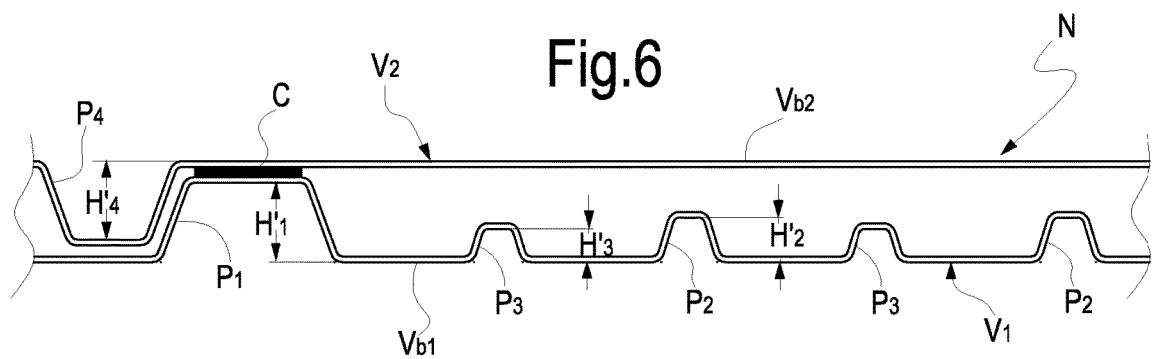
FIGS. 6 and 7 show schematic sections of an embossed web material.

FIG. 6 shows a simplified schematic cross section of a portion of a multi-ply web material N, comprising a first ply V1 and a second ply V2. In the example shown, ply V2 is embossed with embossing protuberances P4 nested between protuberances P1. In some embodiments, protuberances P4 of ply V2 may be nested in areas of ply V1 devoid of embossing protuberances P2 and P3, that is, in areas corresponding to the areas or portions indicated with A of the embossing pattern of the embossing roller. $H'_1$, $H'_2$ and $H'_3$ indicate the heights of the embossing protuberances P1, P2, P3 formed in the cellulose ply V1. These heights are different from one another and are in the following relationship with one another:

$$H'_1 > H'_2 > H'_3$$

These heights may be equal to heights $H_1$, $H_2$ and $H_3$ of the corresponding embossing protuberances formed on the respective embossing roller. This, however, is not necessary. In practice, the heights of the protuberances embossed on the ply may be smaller than the heights of the corresponding embossing protuberances on the roller, since a mutual pressure may be exerted between the rollers in the embossing nip between the embossing roller and the pressure roller such that the elastically yielding coating of the pressure roller does not penetrate completely into the cavities between the embossing protuberances of the embossing roller.

Figure 7:
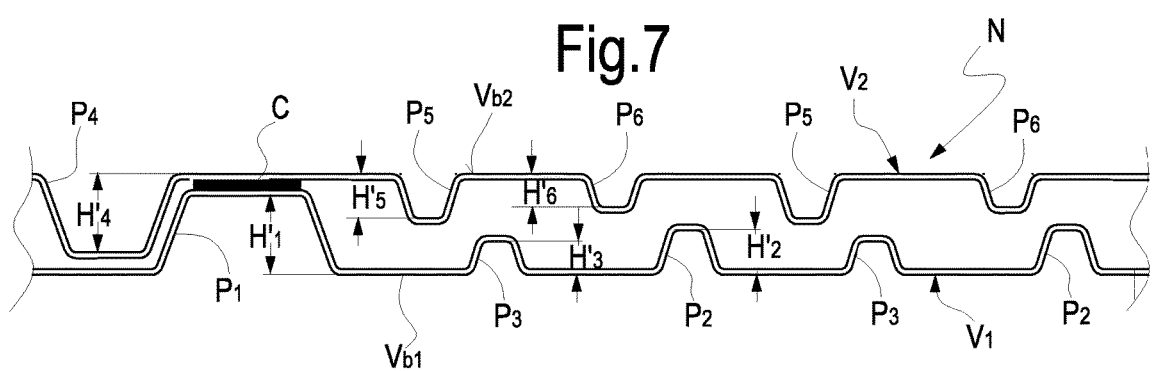

In other embodiments, ply V2 may also be provided with secondary embossing protuberances, of smaller height, preferably of different heights. FIG. 7 shows a simplified and enlarged cross-sectional view of a web material N of this type. Ply V2 is provided with embossing protuberances P4 of a fourth series of protuberances and with protuberances P5 and P6 of a fifth series and a sixth series of embossing protuberances, respectively. The relationship between the heights (herein indicated with $H'_4$, $H'_5$ and $H'_6$) of the protuberances embossed on ply V2 may be $$H'_4 > H'_5 > H'_6$$

In the example in FIG. 7, the two plies V1 and V2 are still arranged in a nested configuration, that is, with protuberances P4 inserted (nested) between protuberances P1. In other embodiments, both in the case of ply V2 with embossing protuberances P4 and in the case of ply V2 with embossing protuberances P4, P5 and P6 in combination, the bonding between the plies can be of the tip-to-tip type, with the heads of at least some of protuberances P1 at the heads of protuberances P4.

The embossing protuberances formed on ply V1 and/or on ply V2 develop from the base material, indicated with Vb1 and Vb2 (FIGS. 6 and 7) towards the inside of the web material N.

The two plies V1 and V2 may be bonded together by gluing using a glue C. This can be distributed on the head surfaces, facing towards the inside of the web material N, of the embossing protuberances P1 and/or P4 of the first series of protuberances, or on at least some of them, as shown in FIGS. 6 and 7.

The background embossing or micro-embossing formed by protuberances P2 and P3 of different heights imparts a consistency, an appearance and a tactile feature to the embossed cellulose material which imitates and resembles that of the tissue paper formed by means of TAD (Through Air Drier) systems, without the plant and energy consumption costs typical of these known systems. Features are thus obtained which are of great aesthetic and functional value at substantially reduced costs.

In some embodiments, the first height $H_1$ or $H'_1$ of the first protuberances of the embossing roller or of the embossed ply may be between about 1.1 and about 2 mm, while the second height $H_2$ or $H'_2$ may be from about 0.25 to about 0.35 mm lower than the first height. In this way, the glue distributed on the heads of the first protuberances, for example via the glue dispensing unit 15, is not applied on the embossing protuberances of the second series and of the third series. In some embodiments, the third height $H_3$ or $H'_3$ is from about 0.1 mm to about 0.3 mm lower than the second height.

The invention claimed is:

1. A cellulose product comprising:
at least a first ply of embossed cellulose material and a second ply of embossed cellulose material, glued together, wherein the first ply comprises a first ply base material, a first series of embossing protuberances, a second series of micro-embossing protuberances and a third series of protuberances, each of the first series of embossing protuberances, each of the second series of micro-embossing protuberances and each of the third series of protuberances projecting from one side of the first ply base material in a direction of the second ply of embossed cellulose material, the first series of embossing protuberances comprising a first height and a top surface to which a glue is applied which bonds the first ply and the second ply to one another, the second series of micro-embossing protuberances having a second height lower than the first height, the third series of micro-embossing protuberances having a third height lower than the second height, wherein the second ply comprises a second ply base material, a fourth series of embossing protuberances, a fifth series of micro-embossing protuberances and a sixth series of micro-embossing protuberances, each of the fourth series of embossing protuberances, each of the fifth series of micro-embossing protuberances and each of the sixth series of micro-embossing protuberances projecting from one side of the second ply base material in a direction of the first ply of embossed cellulose material, the fourth series of embossing protuberances having a fourth height, the fifth series of micro-embossing protuberances having a fifth height lower than the fourth height, the sixth series of micro-embossing protuberances having a sixth height lower than the fifth height, wherein the embossing protuberances of the first series are distributed over areas of the first ply, where the micro-embossing protuberances of the second series and the micro-embossing protuberances of the third series are absent, wherein the embossing protuberances of the fourth series are distributed over areas of the second ply, where the micro-embossing protuberances of the fifth series and the micro-embossing protuberances of the sixth series are absent, wherein the first series of embossing protuberances and the fourth series of embossing protuberances are nested together, wherein the micro-embossing protuberances of the second series and the micro-embossing protuberances of the third series are distributed alternately, wherein the micro-embossing protuberances of the fifth series and the micro-embossing protuberances of the sixth series are distributed alternately.

2. A product according to claim 1, wherein the micro-embossing protuberances of the second series and the micro-embossing protuberances of the third series are distributed along lines, wherein along a first line protuberances of one of said second series and said third series are placed, and along a second line, adjacent to the first line, the micro-embossing protuberances of another one of said second series and said third series are placed, wherein a portion of the first ply embossed cellulose remains at an initial, pre-embossed location of the first ply base material and a portion of the second ply embossed cellulose remains at an initial, pre-embossed location of the second ply base material.

3. A product according to claim 1, wherein the micro-embossing protuberances of the fifth series and the micro-embossing protuberances of the sixth series are distributed along lines, wherein along a first line protuberances of one of said fifth series and said sixth series are placed, and along a second line, adjacent to the first line, micro-embossing protuberances of another one of said fifth series and said sixth series are placed.

4. A product according to claim 1, wherein the first height is between around 1.1 mm and around 2 mm.

5. A product according to claim 1, wherein the second height is between around 0.25 mm and around 0.35 mm lower than the first height.

6. A product according to claim 1, wherein said third height is between around 0.1 mm and around 0.3 mm lower than the second height.

7. A product according to claim 1, wherein the fourth height is between around 1.1 mm and around 2 mm.

8. A product according to claim 1, wherein the fifth height is between around 0.25 mm and around 0.35 mm lower than the fourth height.

9. A product according to claim 1, wherein said sixth height is between around 0.1 mm and around 0.3 mm lower than the fifth height.

10. A product according to claim 2, wherein the lines are parallel to one another.

11. A product according to claim 3, wherein the lines are parallel to one another.

12. A cellulose product comprising:
at least a first ply of embossed cellulose material and a second ply of embossed cellulose material, glued together, wherein the first ply comprises a first series of embossing protuberances, a second series of micro-embossing protuberances and a third series of protuberances, each of the first series of embossing protuberances, each of the second series of micro-embossing protuberances and each of the third series of protuberances extending from a same side of the first ply of embossed cellulose material in a direction of the second ply of embossed cellulose material, wherein a first protuberance-free area is located between each of the first series of embossing protuberances and another one of the first series of embossing protuberances, wherein a second protuberance-free area is located between each of the second series of micro-embossing protuberances and another one of the second series of micro-embossing protuberances, wherein a third protuberance-free area is located between each of the third series of protuberances and another one of the third series of protuberances, the first series of embossing protuberances comprising a first height and a top surface to which a glue is applied which bonds the first ply and the second ply to one another, the second series of micro-embossing protuberances having a second height lower than the first height, the third series of micro-embossing protuberances having a third height lower than the second height, wherein the second ply comprises a fourth series of embossing protuberances, a fifth series of micro-embossing protuberances and a sixth series of micro-embossing protuberances, each of the fourth series of embossing protuberances, each of the fifth series of micro-embossing protuberances and each of the sixth series of micro-embossing protuberances extending from a same side of the second ply in a direction of the first ply of embossed cellulose material, wherein a fourth protuberance-free area is located between each of the fourth series of embossing protuberances and another one of the fourth series of embossing protuberances, wherein a fifth protuberance-free area is located between each of the fifth series of micro-embossing protuberances and another one of the fifth series of micro-embossing protuberances, wherein a sixth protuberance-free area is located between each of the sixth series of micro-embossing protuberances and another one of the sixth series of micro-embossing protuberances, the fourth series of embossing protuberances having a fourth height, the fifth series of micro-embossing protuberances having a fifth height lower than the fourth height, the sixth series of micro-embossing protuberances having a sixth height lower than the fifth height, wherein the embossing protuberances of the first series are distributed over areas of the first ply, where the micro-embossing protuberances of the second series and the micro-embossing protuberances of the third series are absent, wherein the embossing protuberances of the fourth series are distributed over areas of the second ply, where the micro-embossing protuberances of the fifth series and the micro-embossing protuberances of the sixth series are absent, wherein the first series of embossing protuberances and the fourth series of embossing protuberances are nested together, wherein the micro-embossing protuberances of the second series and the micro-embossing protuberances of the third series are distributed alternately, wherein the micro-embossing protuberances of the fifth series and the micro-embossing protuberances of the sixth series are distributed alternately.

13. A product according to claim 12, wherein each of the first protuberance-free area, the second protuberance-free area and the third protuberance-free area is located at a position having a height that is less than the first height, the second height and the third height, each of the fourth protuberance-free area, the second protuberance-free area and the third protuberance-free area being located at a position having a height that is less than the fourth height, the fifth height and sixth height.

14. A product according to claim 12, wherein the micro-embossing protuberances of the second series and the micro-embossing protuberances of the third series are distributed along lines, wherein along a first line protuberances of one of said second series and said third series are placed, and along a second line, adjacent to the first line, the micro-embossing protuberances of another one of said second series and said third series are placed.

15. A product according to claim 12, wherein the micro-embossing protuberances of the fifth series and the micro-embossing protuberances of the sixth series are distributed along lines, wherein along a first line protuberances of one of said fifth series and said sixth series are placed, and along a second line, adjacent to the first line, micro-embossing protuberances of another one of said fifth series and said sixth series are placed.

16. A cellulose product comprising:
at least a first ply of embossed cellulose material and a second ply of embossed cellulose material, glued together, wherein the first ply comprises a first ply base material, a first series of embossing protuberances, a second series of micro-embossing protuberances and a third series of protuberances, the first ply base material being located at least between one of the first series of embossing protuberances and one of the third series of protuberances and at least between one of the second series of micro-embossing protuberances and the one of the third series of protuberances, wherein the first ply base material is free of protuberances, the first ply base material defining a portion of the first ply of embossed cellulose material remaining at an initial, pre-embossed location, the first series of embossing protuberances comprising a first height and a top surface to which a glue is applied which bonds the first ply and the second ply to one another, the second series of micro-embossing protuberances having a second height lower than the first height, the third series of micro-embossing protuberances having a third height lower than the second height, wherein the second ply comprises a second ply base material, a fourth series of embossing protuberances, a fifth series of micro-embossing protuberances and a sixth series of micro-embossing protuberances, the second ply base material being located at least between one of the fourth series of embossing protuberances and one of the fifth series of micro-embossing protuberances and at least between one of the sixth series of micro-embossing protuberances and the one of the fifth series of micro-embossing protuberances, wherein the second ply base material is free of protuberances, the second ply base material defining a portion of the second ply of embossed cellulose material remaining at an initial, pre-embossed location, the fourth series of embossing protuberances having a fourth height, the fifth series of micro-embossing protuberances having a fifth height lower than the fourth height, the sixth series of micro-embossing protuberances having a sixth height lower than the fifth height, wherein the embossing protuberances of the first series are distributed over areas of the first ply, where the micro-embossing protuberances of the second series and the micro-embossing protuberances of the third series are absent, wherein the embossing protuberances of the fourth series are distributed over areas of the second ply, where the micro-embossing protuberances of the fifth series and the micro-embossing protuberances of the sixth series are absent, wherein the first series of embossing protuberances and the fourth series of embossing protuberances are nested together, wherein the micro-embossing protuberances of the second series and the micro-embossing protuberances of the third series are distributed alternately, wherein the micro-embossing protuberances of the fifth series and the micro-embossing protuberances of the sixth series are distributed alternately.

17. A product according to claim 16, wherein the first ply base material comprises a first ply base material outer surface, the first ply base material outer surface being located at a position having a height that is less than first height, the second height and the third height, the second ply base material comprising a second ply base material outer surface, the second ply base material outer surface being located at a position having a height that is less than the fourth height, the fifth height and sixth height.

18. A product according to claim 16, wherein the micro-embossing protuberances of the second series and the micro-embossing protuberances of the third series are distributed along lines, wherein along a first line protuberances of one of said second series and said third series are placed, and along a second line, adjacent to the first line, the micro-embossing protuberances of another one of said second series and said third series are placed.

19. A product according to claim 16, wherein the micro-embossing protuberances of the fifth series and the micro-embossing protuberances of the sixth series are distributed along lines, wherein along a first line protuberances of one of said fifth series and said sixth series are placed, and along a second line, adjacent to the first line, micro-embossing protuberances of another one of said fifth series and said sixth series are placed.

20. A product according to claim 16, wherein the first height is between around 1.1 mm and around 2 mm.

* * * * *